United States Patent Office 3,137,616
Patented June 16, 1964

3,137,616
SOIL FUNGICIDE
Ludwig Maier, Zurich, Switzerland, assignor to Monsanto Company, St. Louis, Mo., a corporation of Delaware
No Drawing. Original application Aug. 22, 1960, Ser. No. 50,843. Divided and this application Dec. 3, 1962, Ser. No. 241,546
Claims priority, application Switzerland Aug. 24, 1959
2 Claims. (Cl. 167—22)

The invention relates to the preparation of N-substituted bis-(amino)-phosphines of the general formula $$R^1P(NR^2R^3)_2$$

in which $R^1$ is a hydrocarbon radical and the group $-NR^2R^3$ is the radical of an aliphatic, cycloaliphatic, araliphatic, aromatic or heterocyclic secondary amine. Especially desirable are these compounds wherein $R^1$ is an aliphatic hydrocarbon radical having not more than 20 carbon atoms and $R^2$ and $R^3$ singly or taken together with the nitrogen atom to which they are attached are hydrocarbon radicals or cyclic hydrocarbon radicals containing a hetero atom and have not more than 20 carbon atoms, provided that if both $R^2$ and $R^3$ are aliphatic at least one contains olefinic unsaturation. This application is a division of copending application Serial No. 50,843, filed August 22, 1960.

The preparation is achieved by reacting a mono-substituted phosphorus dihalide, preferably a chloride or bromide, with a secondary amine in the presence of an acid binding agent according to the following equation:

$$R^1PX_2 + 2HNR^2R^3 \rightarrow R^1P(NR^2R^3)_2 + 2HX \quad (X = \text{halogen})$$

The substituted phosphorus dihalides serving as starting material can be prepared from $PCl_3$ and Grignard reagents or organic halides. Especially useful are the alkyl phosphorus dihalides having at most 3 carbon atoms in their alkyl radicals, as obtained by the process according to the copending patent application No. 823,344, filed June 29, 1959, now U.S. Patent No. 3,057,917.

The aliphatic, cycloaliphatic, araliphatic, aromatic and heterocyclic secondary amines suitable for the reaction are numerous. They include, for example, dimethylamine, diallylamine, dioctylamine, distearylamine, cyclohexylmethylamine, dicyclohexylamine, dibenzylamine, methylaniline, diphenylamine, methyl-naphthylamine, ethylenimine, pyrrolidine, piperidine, morpholine and the like. In the absence of a commonly used abbreviation such as araliphatic, cycloaliphatic and heterocyclic are defined to include cycloaliphatic and heterocyclic amines wherein the amine radicals are attached either directly to aliphatic radicals which are joined to cycloaliphatic or heterocyclic ring atoms or are attached directly to ring carbon atoms, form a part of a heterocyclic ring.

The treatment of organic phosphorus dihalides with secondary amines in the presence of an acid binding agent can be carried out in usual manner. Preferably, as an acid binding agent it is used in excess of the reacting amine, which can be recovered back in the form of the halide salt. In carrying out the reaction, the amine is dissolved in an inert solvent and the phosphorus dihalide is added gradually with agitation and cooling. Since the endproducts are sensible to hydrolysis, it is expedient to exclude any presence of water.

The N-substituted bis-(amino)-phosphines are particularly indicated as means for the extermination of noxious animals and plants, sicknesses, i.e., for uses such as insecticides, fungicides, bactericides, herbicides, etc., and as intermediates for the manufacturing of such means, when $R^1$ is an aliphatic hydrocarbon radical. Especially active are the compounds of which $R^2$ and/or $R^3$ show at least one olefinic double bond. For example, methyl-bis-(diallylamino)-phosphine being unknown up till now, is a good soil fungicide. Preferred compounds for soil fungicidal use are those in which $R^1$, $R^2$ and $R^3$ are aliphatic hydrocarbon radicals having not more than 6 carbon atoms with at least one of $R^2$ and $R^3$ containing olefinic unsaturation. The N-substituted bis-(amino)-phosphines also have a large variety of uses such as rubber softening agents, oxidation inhibitors for polymers such as polyvinyl chloride, gasoline additives such as oxidation inhibitors and deposit scavengers, complexing agents for reacting with mercury and copper chloride and cyanides, etc. The phosphines are useful as intermediates for the making of phosphonium compounds as shown in Example 1 and phosphine sulfides, oxides and selenides as indicated in Examples 8 and 9 and as described hereinbelow, and for making polymers with a phosphorus backbone by reaction with primary amines.

Another object of the invention relates to the preparation of N-substituted bis-(amino)-phosphine sulfides, N-substituted bis-(amino)-phosphine selenides and N-substituted bis-(amino)-phosphine oxides having the general formula $$R^1(Z)P(NR^2R^3)_2$$

in which $R^1$ is a hydrocarbon radical, the group $-NR^2R^3$ is the radical of an aliphatic, cycloaliphatic, araliphatic, aromatic or heterocyclic secondary amine and Z is a sulfur, selenium or oxygen atom.

It was found that sulfur, selenium or oxygen can easily be added to the N-substituted bis-(amino)-phosphines, forming compounds of the above mentioned formula. The addition of sulfur or selenium can be achieved by adding gradually to the bis-(amino)-phosphine an at least stoichiometric quantity of the pulverized element, whereby an exothermic reaction occurs that eventually needs cooling. The addition of oxygen is effected in similar manner by leading in a calculated amount of ozone. In contrary hereto, the addition of sulfur or selenium to the previously employed alkylphosphorus dichlorides, i.e., the starting materials, only is possible by using a catalyst (e.g., anhydrous aluminum chloride).

Further it was found that, referred to the alkylphosphorus dihalides initially put in, the yield of the sulfur and selenium adducts is considerably increased, when the preparation of N-substituted bis-(amino)-phosphines is carried out in the presence of an element mentioned above. In such a case, the synthesis of N-substituted bis-(amino)-phosphines and the addition of sulfur or selenium proceed simultaneously and there are formed N-substituted bis-(amino)-phosphine sulfides or selenides, which are more stable with regard to hydrolysis. The increase yield of intermediate methyl-bis-(dimethylamino)-phosphine becomes evident by comparison of the Examples 1 and 8.

It is understood that by the treatment with ozone or other oxidizing agents, there may also be affected the substituents $R^1$, $R^2$ and $R^3$, but as a rule the principle of the group —$NR^2R^3$ still remains preserved.

In consequence of this fact it is advantageous to subject to the oxidation N-substituted bis-(amino)-phosphine sulfides. These compounds in accordance to the invention now are easily available and the sulfur can be exchanged for oxygen without affecting any other constituent. Such an exchange can be caused by treatment of bis-(amino)-phosphine sulfides with, for example, HgO.

The N-substituted bis-(amino)-phosphine sulfides, selenides and oxides are valuable means for the extermination of noxious animals and plant sicknesses and are intermediates for the manufacturing of such means.

*Example 1*

To a solution of 60 g. dimethylamine (1⅓ moles) in 300 ml. of ether are added gradually with stirring and cooling a solution of 50 g. methyldibromophosphine (about ¼ mole) in 150 ml. of ether. After one hour the precipitated dimethylamine hydrobromide is filtered off and washed with ether. Yield 59 g. (theory 61 g.).

From the filtrate upon distillation of the solvent and of excess dimethylamine is obtained methyl-bis-(dimethylamine)-phosphine. Yield 19 g. (=54%). It is a colorless liquid having a boiling point of 137°–141°/725 mm.

Analysis:

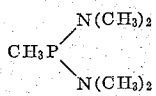

Percent C calcd. 44.76, found 44.47; percent H calcd. 11.72, found 11.24; percent N calcd. 20.88, found 19.88. By reaction with methyl iodide is obtained dimethyl-bis-(dimethylamino)-phosphonium iodide. Melting point 270°.

Analysis:

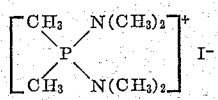

Percent I calcd. 45.97, found 45.54.

The compounds listed in the following table were prepared in analogous manner:

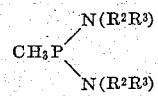

TABLE

| No. | —$NR^2R^3$ | Boiling point | Yield, percent |
|---|---|---|---|
| 1 | Dimethylamine | 137–141°/725 mm | 58.5 |
| 2 | Diallylamine | 80–85°/0.02 mm | 46 |
| 3 | Cyclohexyl-methylamine | 119–123°/0.13 mm | 41.5 |
| 4 | Piperidine | 80–82°/0.13 mm | 29 |
| 5 | Morpholine | 87–88°/0.15 mm | 62 |
| 6 | Methylaniline | 136–138°/0.2 mm | 27 |
| 7 | Dibenzylamine | 115–117°/0.13 mm | 65 |

In run No. 1 chloroform was used as a solvent. At the end of the reaction the chloroform was distilled off, the reaction product extracted with ether and fractionally distilled.

*Example 8*

To a solution of 60 g. dimethylamine (1⅓ moles) in 300 ml. of ether and of 8 g. suspended sulfur (¼ mole) are added gradually with stirring and cooling a solution of 51.5 g. methyldibromophosphine (¼ mole) in 150 ml. of ether. After one hour the precipitated dimethylamine hydrobromide is filtered off and washed with ether.

The fractional distillation of the filtrate gives at 245–247°/275 mm. methyl-bis-(dimethylamino)-phosphine sulfide. Yield 37.5 g. (=90%).

*Example 9*

To 44.7 g. of methyl-bis-(dimethylamino)-phosphine (⅓ mole) are added gradually with stirring and cooling 10.7 g. of sulfur powder (⅓ mole).

When all of the sulfur is dissolved the methyl-bis-(dimethylamino)-phosphine sulfide is fractionated: B.P. 245–247°/725 mm. Yield 54 g. (=98%).

*Example 10*

This example illustrates the testing of the product of Example 2, namely, methyl-bis-(diallylamine)-phosphine as a soil fungicide. In this test method naturally-infested soil fortified with fungi that incite root rots, stem cankers, seedling blights, and seed decay, is treated with a test chemical and incubated in a sealed container for a period of 24 hours. Seeds are sown in the treated soil which is then incubated at 70° F. for 48 hours before being removed to greenhouse benches. Disease assessments are made two weeks later.

A uniform supply of infested soil containing the following organisms is prepared:

Rhizoctania solani
Fusarimu oxysporum f. vasinfectum
Sclerotium rolfsii
Verticillium albo-atrum
Pythium ultimum A 6 milliliter aliquot of a 1% stock solution of a test chemical is pipeted into a mason jar containing 600 grams of infested soil. This initial application rate is 100 p.p.m. or approximately 200 lbs. per 6-inch acre. The jar is sealed and the contents are thoroughly mixed by vigorous shaking. The treated soil is incubated at 25° C. for 24 hours and is transferred to 4-inch azalea pots. Fifteen cotton and cucumber seeds are sown in each pot. The seeded pots are then incubated at 70° F. and at a high relative humidity (96–98%) to insure activity of the organisms in the soil. Forty-eight hours later the pots are removed to the greenhouse where disease assessments are made two weeks later.

In evaluating the tests the number of seedlings emerged and the number remaining healthy are recorded. The percent emergence and disease incidence is based on the innoculated, untreated, and the sterile soil treatments. The following rate scale is used.

| Rating: | Number of healthy plants/30 |
|---|---|
| E—Excellent | 26–30 |
| P—Promising | 19–25 |
| F—Fair | 11–18 |
| N—No good | 10 or less |

In the evaluation host specificity, injury to shoots and roots, as well as other abnormalities, are noted.

It was found that methyl-bis-(diallylamine)-phosphine showed promising soil fungicidal activity at concentrations as low as 25 p.p.m.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure.

Of the named heterocycles only oxygen and nitrogen containing nuclei are described here, but of course, sulfur containing heterocyclic rings are also common and can be used; however, it is not intended to exclude the less common phosphorus, arsenic, antimony, selenium, etc., heterocycles.

It stands to reason that for the preparation of N-substituted bis-(amino)-phosphines from organic phosphorus dihalides and secondary amines, other acid binding agents such as tertiary aliphatic amines, pyridine, lutidine, etc., or inorganic bases such as potassium carbonate, sodium carbonate, calcium oxide, etc. may be used.

In the production of compounds containing olefinic double bonds it is preferable to add before the distillation little amounts (0.1–1%) of polymerization inhibitors like hydroquinone, phenyl-beta-naphthylamine, etc.

What is claimed is:

1. The method comprising treating soil with a sufficient amount to inhibit fungus growth of a compound of the formula $$R^1P(NR^2R^3)_2$$

wherein $R^1$ and $R^3$ are aliphatic hydrocarbon having not more than 6 carbon atoms, and $R^2$ is aliphatic hydrocarbon containing olefinic unsaturation and having not more than 6 carbon atoms.

2. The method comprising treating soil with a sufficient amount of methyl-bis-(diallylamine)-phosphine to inhibit fungus growth.

References Cited in the file of this patent
UNITED STATES PATENTS
2,703,814  Dye _____ Mar. 8, 1955